C. WAGNER & A. HORMEL.
LITHOGRAPHIC PRESS.
APPLICATION FILED DEC. 11, 1915.
1,197,875.
Patented Sept. 12, 1916.
5 SHEETS—SHEET 3.
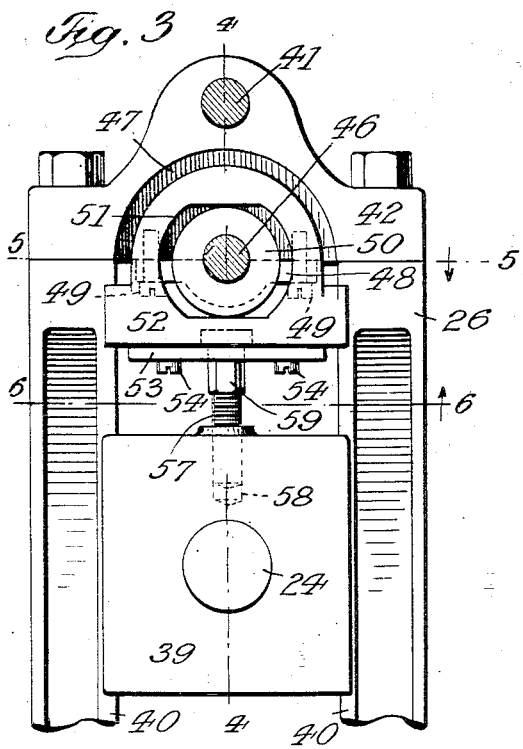
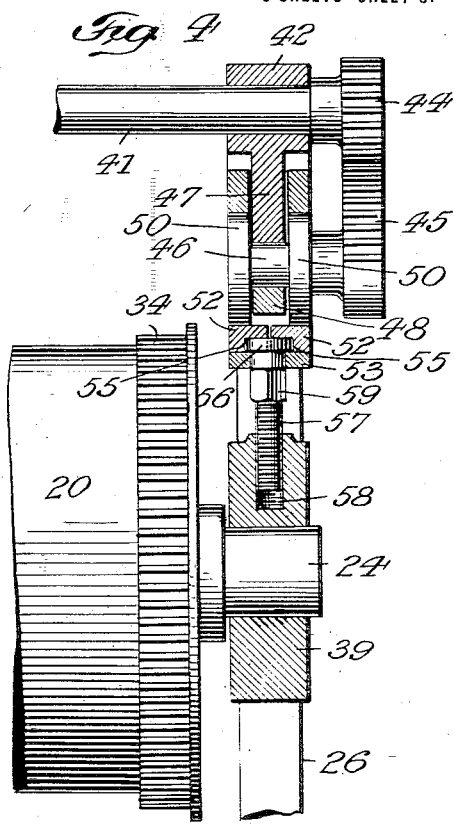
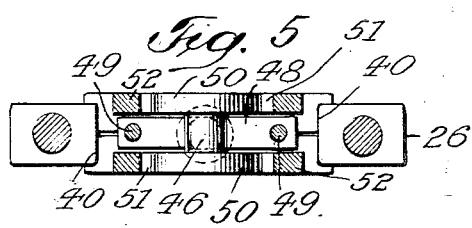
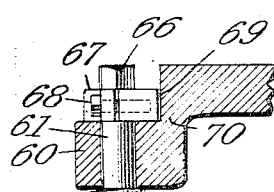
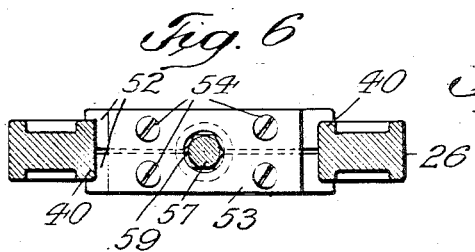
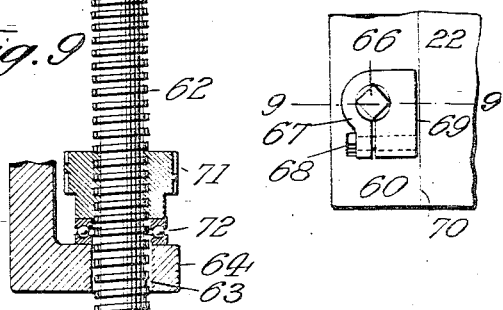
WITNESS
INVENTORS
Charles Wagner
and August Hormel
BY
ATTORNEY

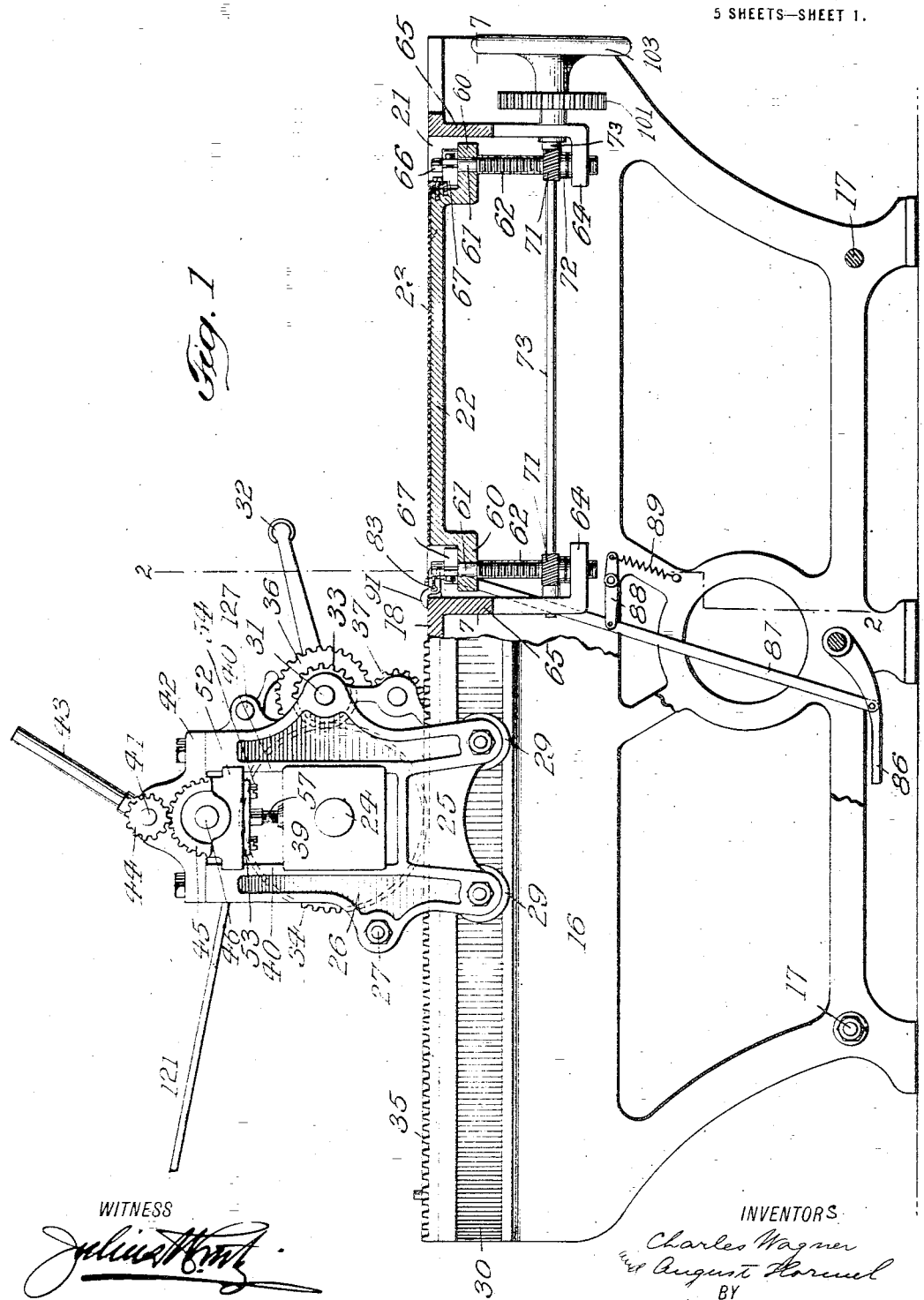

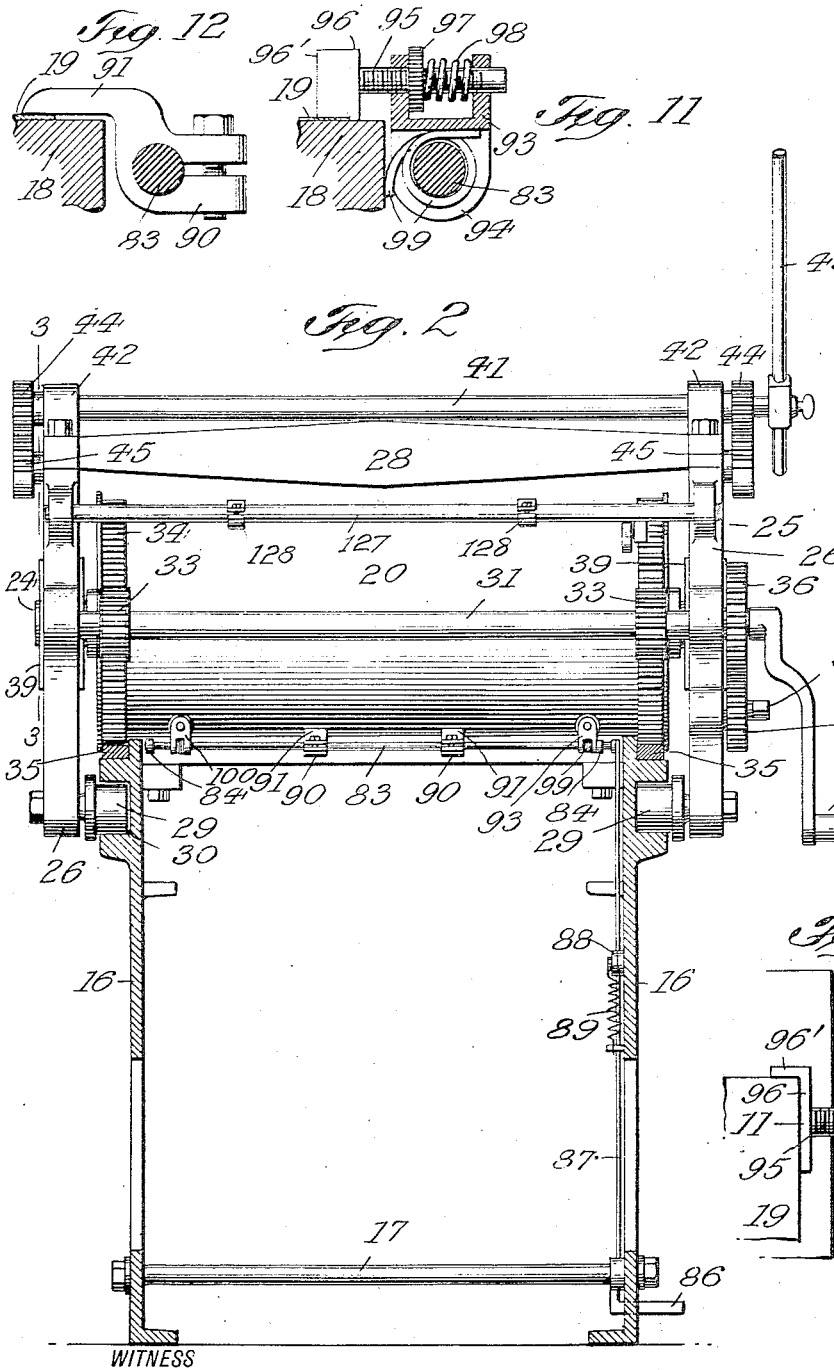

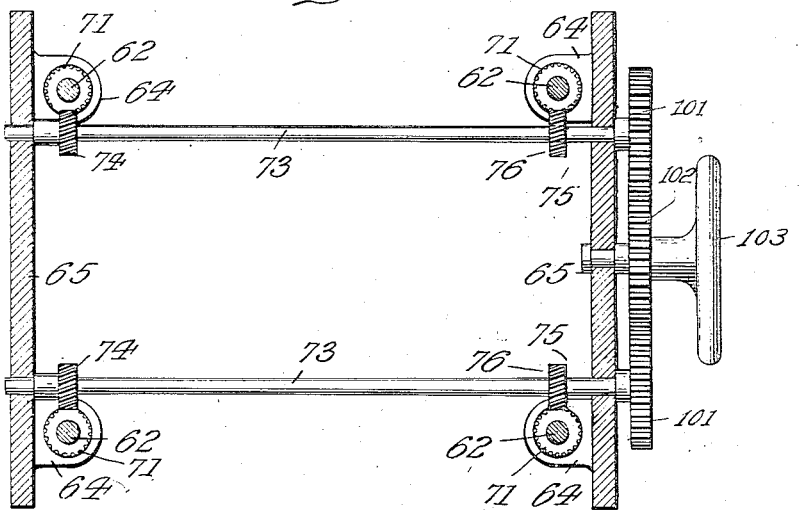
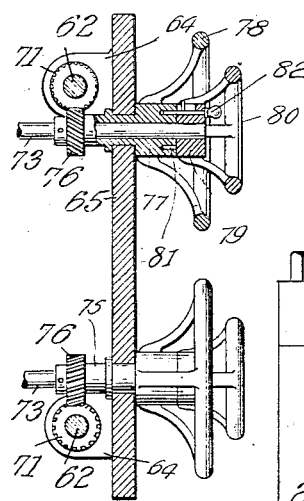
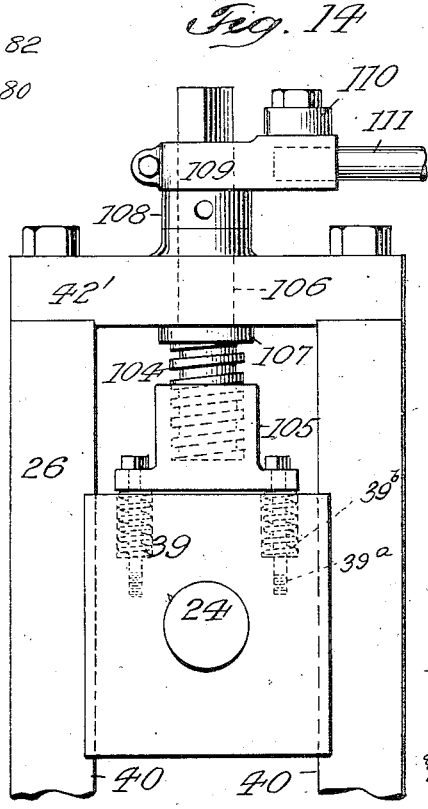
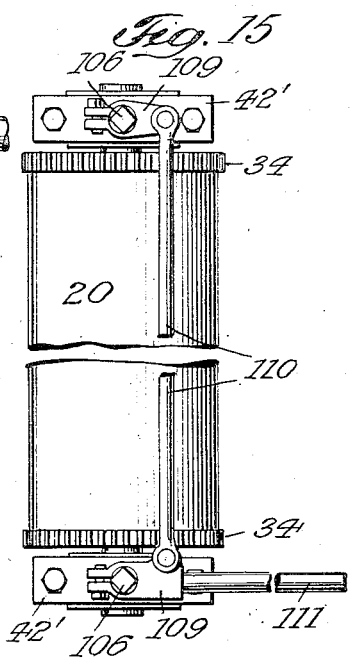

C. WAGNER & A. HORMEL.
LITHOGRAPHIC PRESS.
APPLICATION FILED DEC. 11, 1915.
1,197,875.
Patented Sept. 12, 1916.
5 SHEETS—SHEET 5.
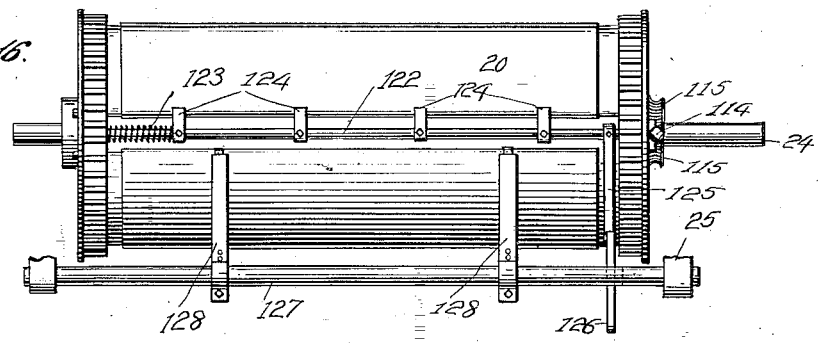
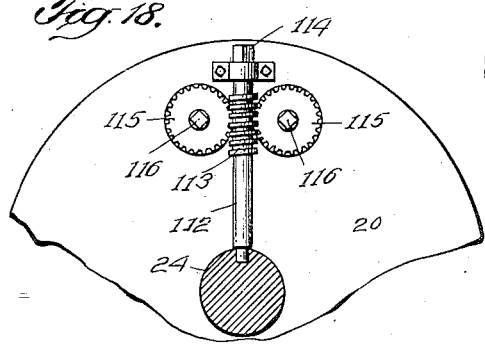
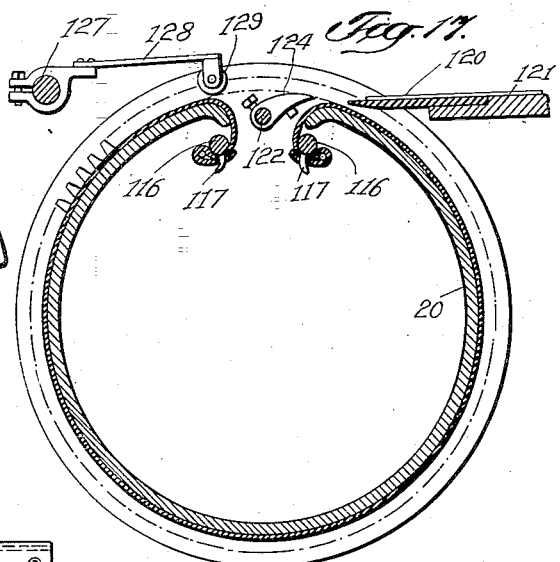
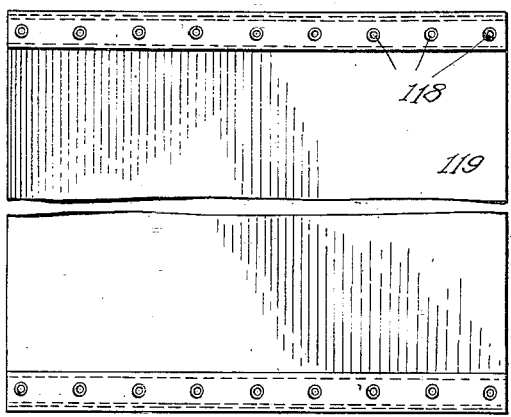
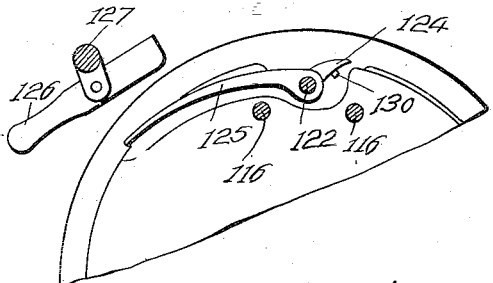
WITNESS
INVENTORS.
Charles Wagner
and August Hormel
BY
ATTORNEY

UNITED STATES PATENT OFFICE.

CHARLES WAGNER, OF GRANTWOOD, NEW JERSEY, AND AUGUST HORMEL, OF NEW YORK, N. Y.

LITHOGRAPHIC PRESS.

1,197,875.          Specification of Letters Patent.     Patented Sept. 12, 1916.

Application filed December 11, 1915. Serial No. 66,243.

*To all whom it may concern:*

Be it known that we, CHARLES WAGNER, a citizen of the United States, residing at Grantwood, county of Bergen, and State of New Jersey, and AUGUST HORMEL, a citizen of the United States, residing at New York city, county and State of New York, have invented certain new and useful Improvements in Lithographic Presses, of which the following is a specification.

This invention relates to a lithographic press of novel construction and more particularly to novel means for bringing the lithographic stone or plate and the lithographic printing or transfer roller into proper mutual correlation.

The invention also comprises other novel features of construction more fully pointed out in the accompanying specification and claims.

In the accompanying drawing, Figure 1 is a side elevation partly in section of a lithographic press embodying our invention; Fig. 2 a vertical cross section on line 2—2 Fig. 1; Fig. 3 a vertical section on line 3—3 Fig. 2; Fig. 4 a transverse section on line 4—4 Fig. 3; Fig. 5 a horizontal section on line 5—5 Fig. 3; Fig. 6 a horizontal section on line 6—6 Fig. 3; Fig. 7 a horizontal section on line 7—7 Fig. 1; Fig. 8 a plan view of part of the support; Fig. 9 a cross section on line 9—9 Fig. 8; Fig. 10 a plan view of a part of the sheet-adjusting means; Fig. 11 a cross section on line 11—11 Fig. 10; Fig. 12 a detail section showing one of the paper clamps; Fig. 13 a horizontal section of modified support-adjusting means; Fig. 14 a side elevation of a modified actuating device for the lithographic roller; Fig. 15 a plan of Fig. 14 on a reduced scale; Fig. 16, a side view of the lithographic roller; Fig. 17 an enlarged cross section thereof; Fig. 18 a detail of the blanket tightening means; Fig. 19 a detail of the paper gripping means, and Fig. 20 a detail of the blanket.

Our improved lithographic press comprises essentially a pair of side frames 16 connected by stay rods 17 in the usual manner. Intermediate the frames 16 is located a stationary printing plate or table 18 for supporting the sheet 19 that is to receive the lithographic imprint from the lithographic printing or transfer roller 20, this roller being preferably constructed according to Patent No. 1,129,435 granted to us February 23, 1915. In front of table 18, there is provided between the side frames 16, a substantially rectangular opening 21 within which is accommodated a vertically adjustable support or bed 22 for the lithographic stone or plate 23. The roller 20 is adapted to travel across table 18 and support 22 for which purpose the roller shaft 24 is rotatably mounted in a carriage 25 comprising essentially a pair of frames 26 connected with each other by means of a rod 27 and a traverse 28. Near its lower end, each frame 26 carries a pair of rollers 29 that engage a corresponding guide way 30 of the side frame 16. The means for moving the carriage back and forth comprise a transverse shaft 31 operable by a crank 32 and carrying a pair of relatively fixed pinions 33. The latter engage corresponding gear wheels 34 attached to roller 20 which gear wheels in turn mesh into racks 35 extending along the top of frames 16, the pitch-lines of said racks lying substantially within the surface plane of plate 18. It will thus be seen that by rotating crank 32 in one or the other direction, the carriage 25 together with the roller 20 will be moved back or forth while the roller is rotated with such an angular speed as to be truly rolled along table 18 without being subjected to any sliding movement relatively to said table. In order to be able to operate carriage 25 and roller 20 at a lower rate of speed, shaft 31 is provided with a relatively fixed gear wheel 36 into which meshes a pinion 37 the shaft of which is provided with a squared end 38 upon which the crank 32 may be fitted.

As the proper operation of presses of the kind described, requires an alternating raising and lowering of the roller 20, the roller shaft 24 is rotatably supported at each end by a bearing block 39 that slidably engages corresponding guide rails 40 forming part of each frame 26. Blocks 39 receive vertical movement from a transverse rock shaft 41 mounted in suitably shaped covers 42 secured to the frames 26, said rock shaft being operable by means of a hand lever 43. At each end, shaft 41 carries a pinion 44 that meshes into a toothed segment 45 of a cam shaft 46. The latter is journaled in a bearing jointly formed by a central substantially semi-circular web 47 of cover 42 and a cross piece 48 attached to said web by screws 49. Each shaft 46 is provided with a pair of relatively fixed cams or eccentrics 50 straddling the web 47 each of said cams being received within a correspondingly shaped opening 51 of a slide 52. The slides 52 are firmly attached to a common base 53 by screws 54 and are movable along the rails 40. The slides 52 are provided with opposed recesses 55 adapted for the reception of the head 56 of a screw bolt 57 that passes loosely through a bore of the base 53. Bolt 57 is tapped into a correspondingly threaded socket 58 of the block 39, an adjustment being rendered possible by providing an angular portion 59 on said bolt that is adapted to be engaged by a corresponding tool. It will be seen that by properly operating the hand lever 43, uniform rotary motion is imparted to both of the cam shafts 46 so that the roller 20 is in turn uniformly raised and lowered at both of its ends.

The means for adjusting the support 22 of the lithographic stone or plate are as follows:—Along its front and rear ends, support 22 is provided with angular flanges 60. In proximity to each end, each of the flanges 60 is perforated for the reception of the shank 61 of a screw spindle 62 that passes loosely through a corresponding opening 63 provided within brackets 64 of cross webs 65 that form part of the machine frame. The spindle 62 is provided with a squared head 66 and is firmly attached to the flange 60 by means of a split clamping member 67 that is seated on flange 60 and may be tightened against said head by means of a screw 68. The member 67 is provided with a straight inner side 69 which by abutting against the upright web 70 of flange 60, effectively prevents a rotation of the screw spindle 62. Above its bracket 64, each spindle is engaged by a toothed wheel 71, a ball bearing 72 being preferably interposed between said bracket and wheel. For operating the wheels 71, a pair of shafts 73 is provided, said shafts being rotatably supported by the cross webs 65. Near its rear end, each shaft 73 carries a relatively fixed toothed wheel 74 meshing into the corresponding rear wheel 71, while at its front end, each shaft carries a relatively fixed toothed wheel 76 meshing into the corresponding front wheel 71. Shafts 73 carry at their protruding ends gear wheels 101 with which meshes a common gear wheel 102 provided with a hand wheel 103. Upon a rotation of the latter, both shafts 73, will be turned to simultaneously raise or lower spindles 62 by means of wheels 74, 71 and 76, 71 respectively, thus raising or lowering support 22 at all of its four corners. A separate adjustment of the support at any one of its corners may be effected by loosening the corresponding clamping member 67 and then adjusting spindle 62.

Means are provided for clamping the sheets to be printed to table 18 in the proper position. These means are shown to consist of a transverse shaft 83 mounted in bearings 84 of table 18, the shaft carrying at one end a relatively fixed arm 85. The latter is connected to a pedal 86 by means of a connecting rod 87 which is engaged by a two-arm lever 88 influenced by a spring 89. To the shaft 83 are adjustably secured suitable clamps 90 made integral with fingers 91 which are forced against the table 18 by the spring 89, thereby firmly holding the paper sheet 19 interposed between said table and fingers in position. Additional means are provided for insuring a true position of the sheet on the table, which means consist of a U-shaped holder 93 having a pair of depending spaced lugs 94 that loosely surround the shaft 83. Within suitable perforations of holder 93 is slidably mounted the screw stem 95 of an angular abutment or stop 96. The stem 95 is engaged by a milled nut 97 which is tightly pressed against holder 93 by means of a spring 98. Between the lugs 94 of holder 93, the shaft 83 is loosely embraced by a coiled spring 99 that tends to turn said holder in such a manner that the stop is firmly pressed against the table 18. In proximity to the other end of shaft 83, there is provided a holder 100 which is in all respects a duplicate of holder 93, with the only exception that the stop is not provided with the outer shank 96' but comprises but a straight plate extending at right angles to stem 95. It will be seen that the holders 93, 100 may be readily set on shaft 83 to any position desired, the holders retaining these positions owing to the frictional contact of the stops with table 18. On the other hand, these holders do not in any way interfere with the rocking movement of the shaft 83 for clamping consecutive sheets to the table.

In Fig. 13, a modification of the bed-adjusting means is shown. In this case, each shaft 73 is encompassed by a rotatable sleeve 75 carrying a hyperbolic toothed wheel 76 that engages the corresponding front wheel 71. Sleeve 75 is made integral with the hub 77 of a hand wheel 78, while to the protruding end of shaft 73 is secured the hub 79 of a hand wheel 80. By operating either the wheel 78 or the wheel 80, bed 22 will be raised or lowered either at its front or rear corners. Means are provided for coupling the hubs 77, 79, so as to cause a uniform and simultaneous up or down movement of bed 22 at one of its sides, for which purpose hub 77 is provided with a plurality of sockets 81 that are adapted to be engaged by manually operable pins 82 slidable in hub 79.

In lieu of vertically reciprocating the printing roller 20 by means of the eccentrics 50, the roller may be actuated by screw spindles 104 as illustrated in Figs. 14 and 15. These spindles engage threaded heads 105 secured to the slide blocks 39 by means of pins 39$^a$ surrounded by coiled springs 39$^b$, so that a yielding connection is formed between the heads and blocks. The spindles pass loosely with their shanks 106 through corresponding bores of the cross pieces 42' of frames 26, an axial displacement of the spindles being prevented by collars 107 and clamp rings 108. To the shanks 106 are adjustably clamped arms 109 that are mutually connected by a link 110, one of the arms 109 being provided with a hand lever 111. It will be seen that by oscillating the lever 111 the spindles 104 are rotated in unison thereby raising or lowering the blocks 39 carrying the lithographic roller.

Figs. 16–20 illustrate the means for tensioning the blanket on the roller 20 and for securing the paper to the roller in direct printing. In shaft 24 is stepped a radial spindle 112 carrying a worm 113 and having a squared head 114 by means of which it may be turned. Worm 113 is engaged by a pair of worm wheels 115 mounted on a pair of longitudinal parallel shafts 116 that are journaled in the heads of the roller. These shafts are provided with a plurality of hooks or similar coupling devices 117 adapted to engage corresponding apertures 118 formed along the reinforced edges of the blanket 119. After the latter has been hooked to shafts 116, spindle 112 is turned by means of a suitable key, so as to draw the ends of the blanket toward each other, and thus tighten the blanket upon the roller. When the worm shaft is released, it will retain its position, and will thus hold the shafts 116 and consequently the blanket without any additional locking means. This is so for the reason that the pitch of the worm shaft is so fine that it cannot be rotated axially, through a rotatory impulse of wheels 115.

The paper 120 is fed to the roller from a table or shelf 121, that is mounted on carriage 25. There is hung in the roller, a rock shaft 122 influenced by a spring 123, and furnished with a plurality of dogs or grippers 124. From shaft 122 extends a tail 125, adapted to be engaged by a lever 126 fulcrumed to a shaft 127, which is mounted in carriage 25. This shaft furthermore carries a pair of resilient arms 128 in which are hung a pair of pressure rolls 129.

In introducing a sheet of paper, lever 126 is turned to press down tail 125, and thus turn shaft 122 and raise dogs 124. The paper is projected with its forward edge against stops 130 of grippers 124, and then the lever is swung back, to release tail 125, and cause spring 123 to so turn shaft 122 that the dogs will grip the paper. As roller 20 is revolved in the direction of the arrow, the paper will become engaged by rolls 129, so that in this way, the paper will become properly wound and tightened on the roller.

The operation is as follows:

*Direct printing.*—After the stone or plate has been adjusted on bed 22, and properly inked up, the sheet is placed on the shelf 121 inserted in the grippers 124 and wound on the cylinder. The latter is lowered by hand lever 43, and rolled over the stone or plate by crank 32.

*Offset printing.*—The shelf 121 is removed and the stone or plate is adjusted on bed 22 and inked up as before. The sheet is placed on table 18 and is engaged by clamps 90. The blanket 119 is secured to cylinder 20 by couplings 117, and the cylinder is lowered by hand lever 43, and is rolled over the length of the press, starting from the end of bed 22, thus bringing the imprint from the stone or plate to the blanket and thence to the sheet.

We claim:

1. A lithographic press comprising a frame, a stationary printing table supported thereby, a carriage movable along said table and comprising a pair of connected frames, slide blocks engaging said frames, a roller journaled in said blocks, slides also engaging said frames, adjustable means for connecting the blocks to the slides, a rock shaft mounted in the frame, a cam shaft intergeared with the rock shaft, and cams mounted on the cam shaft and engaging the slides to raise and lower said blocks.

2. A lithographic press comprising a frame, a stationary printing table supported thereby, a carriage movable along said table and comprising a pair of connected frames, slide blocks engaging said frames, a roller journaled in said blocks, slides also engaging said frames, each slide being provided with a pair of alined openings, a cam shaft journaled in each slide, a pair of cams fast on each cam shaft and accommodated within the slide-openings, means for adjustably connecting the blocks to the slides, and common means for simultaneously oscillating the cam shafts.

3. In a lithographic press, a carriage comprising a pair of connected frames, slide blocks engaging said frames, a roller journaled in said blocks, a bipartite slide engaging each frame above the slide block and provided with alined openings, a base carried by the bipartite slide, a screw stem for adjustably connecting the block and slide-base of each frame, a cam shaft journaled in each frame, a pair of cams carried thereby and accommodated within the slide-openings, and common means for simultaneously oscillating the cam shafts of both frames.

4. In a lithographic press, a carriage comprising a pair of connected frames, slide blocks engaging said frames, a roller journaled in said blocks, a bipartite slide engaging each frame above the slide block, and provided with alined openings, a base carried by the bipartite slide, a screw stem for adjustably connecting the block and slide-base of each frame, a cover secured to each frame and having a web, a cross piece secured to said web, a cam shaft rotatably supported by each said web and cross piece, a pair of cams carried by said shaft and accommodated within the slide-openings, a toothed segment fast on each cam shaft, a pinion engaging each segment, and a manually reciprocative shaft journaled in the covers of both frames and carrying said pinions.

5. In a lithographic press, a frame, a bed movably mounted thereon, screw spindles mounted in the frame and engaging the bed in proximity to the corners thereof, means for simultaneously raising or lowering the spindles, clamps mounted on the upper ends of the spindles, means for tightening said clamps upon the spindles, and abutments on the bed adapted to be engaged by the clamps.

6. In a lithographic press, a frame, a bed movably mounted thereon, said bed being provided with angular end flanges, screw spindles mounted in the frame and passing loosely through said flanges, means for simultaneously raising or lowering said spindles, and clamping members engaging the upper ends of said spindles, said clamping members being seated upon the angular flanges and abutting against the upright webs thereof.

7. In a lithographic press, a frame, a printing table carried thereby, a rock shaft on said frame adjacent said table, adjustable clamps on said shaft and adapted to hold the sheet to be printed to said table, and spring-influenced adjustable stops for said sheet that are loosely mounted on said shaft.

8. In a lithographic press, a frame, a printing table carried thereby, a rock shaft on said frame adjacent said table, adjustable clamps on said shaft and adapted to hold the sheet to be printed to said table, holders loosely engaging said shaft, stops adjustably mounted on said holders, and springs engaging the holders and forcing the stops against the table.

9. In a lithographic press, a frame, a printing table carried thereby, a rock shaft on said frame adjacent said table, adjustable clamps on said shaft and adapted to hold the sheet to be printed to said table, holders loosely mounted on said shaft, stops carried by the holders, means for adjusting said stops on said holders, and springs coiled about the shaft and forcing the stops against the table.

CHARLES WAGNER.
AUGUST HORMEL.